Oct. 17, 1950         G. ANDERSEN         2,525,850
ELECTRIC HEATER OF THE PANEL OR BOTTOM MOLDING TYPE
Filed March 14, 1947         4 Sheets-Sheet 1
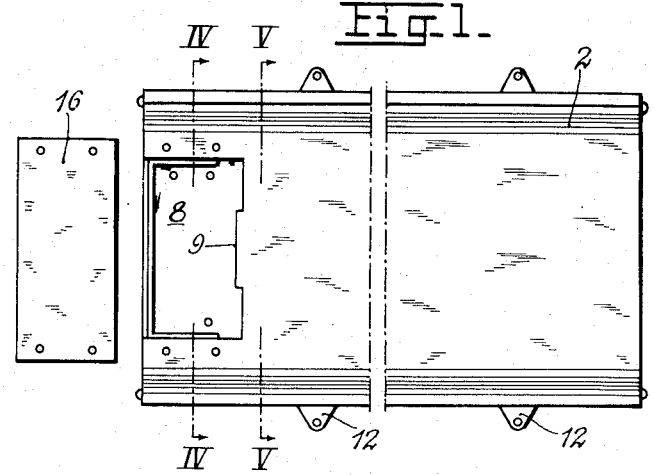
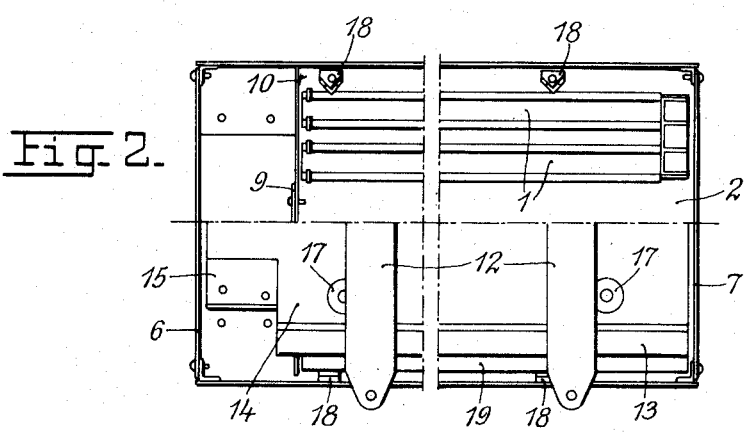
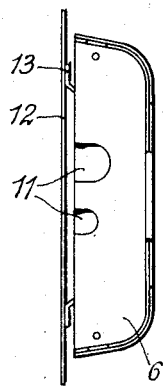
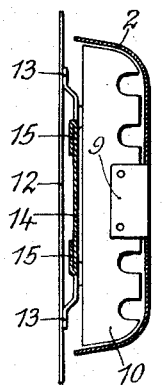
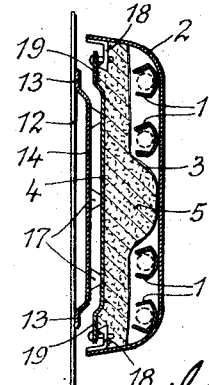

Oct. 17, 1950          G. ANDERSEN          2,525,850
ELECTRIC HEATER OF THE PANEL OR BOTTOM MOLDING TYPE
Filed March 14, 1947          4 Sheets-Sheet 2
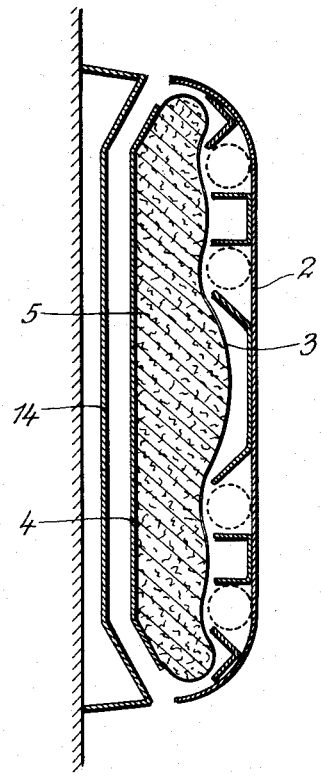
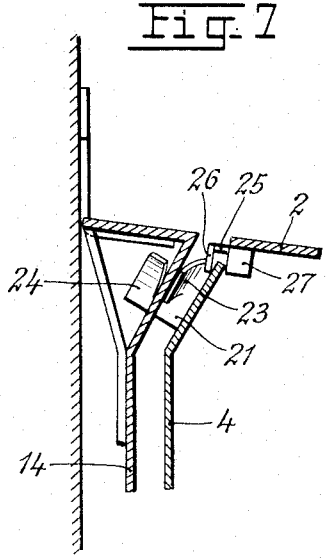
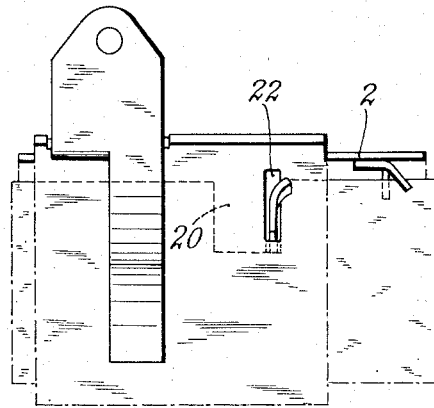

Oct. 17, 1950 G. ANDERSEN 2,525,850
ELECTRIC HEATER OF THE PANEL OR BOTTOM MOLDING TYPE
Filed March 14, 1947 4 Sheets-Sheet 3
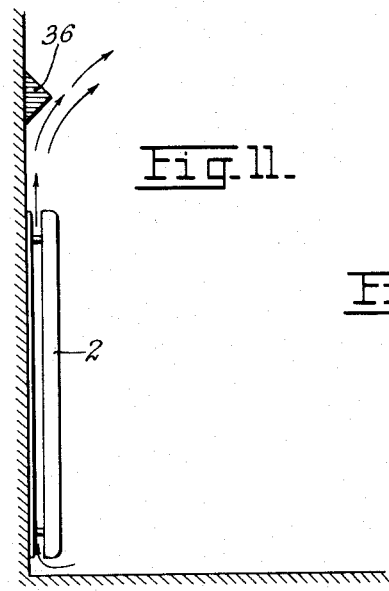
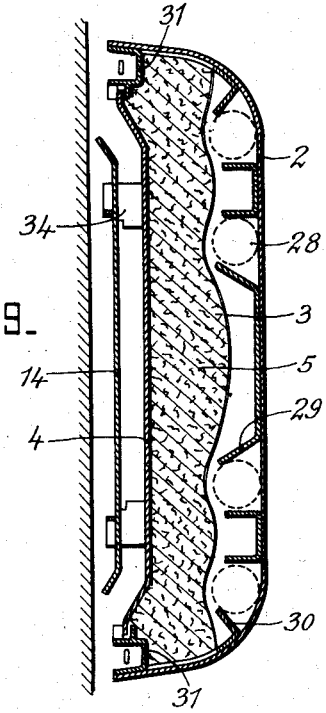
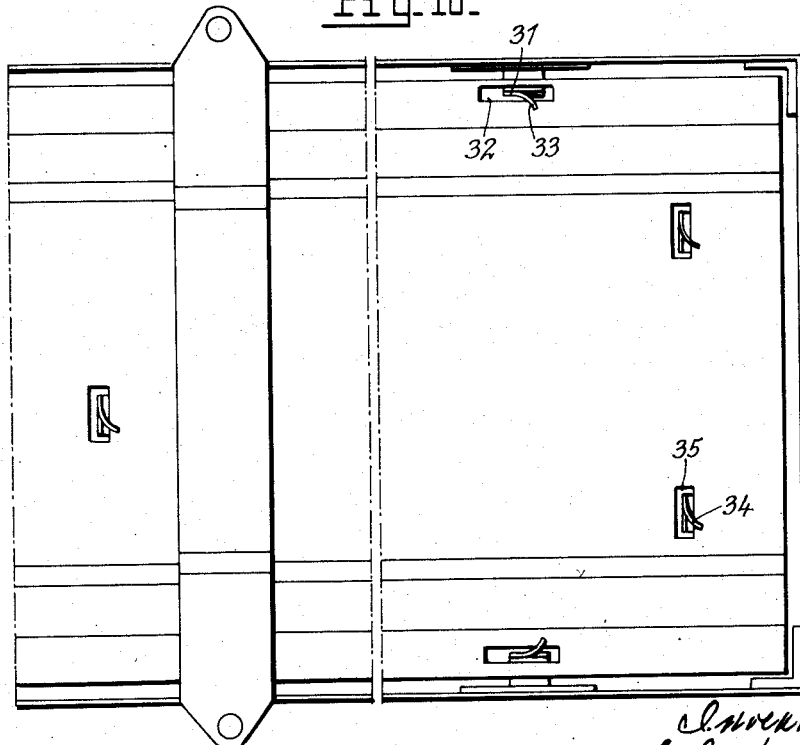

Oct. 17, 1950  G. ANDERSEN  2,525,850
ELECTRIC HEATER OF THE PANEL OR BOTTOM MOLDING TYPE
Filed March 14, 1947  4 Sheets-Sheet 4
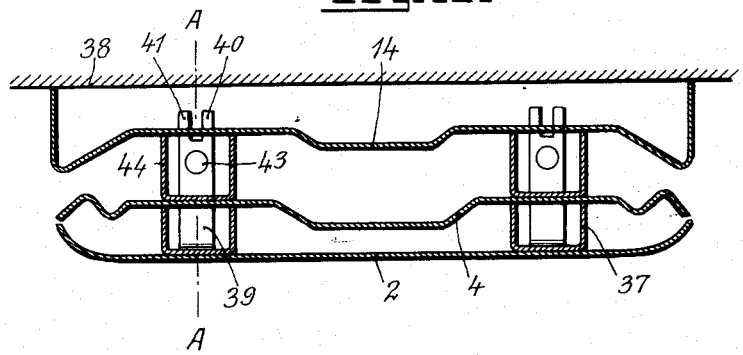
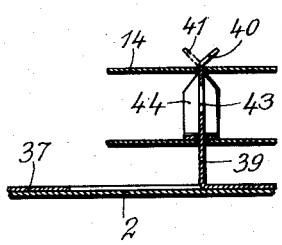 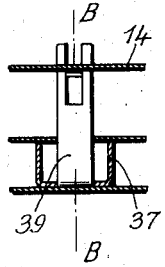 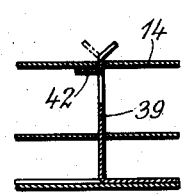
Inventor:
G. Andersen
ATTY By E. F. Wenderoth Patented Oct. 17, 1950

2,525,850

UNITED STATES PATENT OFFICE 2,525,850

ELECTRIC HEATER OF THE PANEL OR BOTTOM MOLDING TYPE

Gustav Andersen, Oslo, Norway

Application March 14, 1947, Serial No. 734,792
In Norway February 19, 1944

1 Claim. (Cl. 219—34)

The present invention relates to electric room heaters of the kind which are adapted to be secured to the inner walls of the rooms to be heated and which are usually called panel heaters.

More particularly the invention relates to electric room heaters of the kind specified, which are adapted to be used as bottom moulding, replacing the usual bottom moulding of wood or the like which extends from the floor of the room a short distance upwards along the walls.

The most important problem in electric room heaters of the kind referred to is to prevent heat from the electric resistance elements from being transmitted by radiation or conduction to the walls, the greatest possible portion of the heat energy being given off as radiation into the room in which the heaters are mounted.

In accordance with the present invention this main problem is solved by providing the heaters besides the heat radiating sheet with a double backwall, the two sheets of which are separated by an air space, which is open as well at the bottom as at the top, so that a current of air will pass between the two sheets of the back wall when the heater is in operation.

In accordance with another feature of the invention means are provided for reducing as much as possible the transmission of heat by radiation or conduction from the front sheet of the heater to the back sheet, which is to be secured to the wall.

Further features of the invention will be pointed out in the following specification with reference to the drawings which illustrate a number of embodiments of the invention.

Fig. 1 is a front view of the heater.

Fig. 2 illustrates the heater seen from behind (turned upside down from Fig. 1) and with the rear walls as well as the insulation material removed from the upper half on the drawing.

Fig. 3 illustrates the heater of Fig. 1 seen from the left end.

Figs. 4 and 5 are sections on the lines IV—IV and V—V on Fig. 1 respectively.

Fig. 6 is a cross section through another embodiment of the invention.

Fig. 7 is a detail cross section on a larger scale of the same embodiment, and

Fig. 8 is a view from behind of the part illustrated on Fig. 7.

Fig. 9 is a cross section of another embodiment of the invention.

Fig. 10 is a front view of the same.

Fig. 11 is a diagrammatical sectional view on a reduced scale of an arrangement to be used in connection with the heater.

Fig. 12 is a cross section of a further embodiment.

Fig. 13 is a section on the line A—A of Figure 12.

Fig. 14 is a detail section of a modified construction and

Fig. 15 is a section on the line B—B of Fig. 14.

The element holders 1 (Figs. 2 and 5) are welded to the inside of the front wall 2, the profile of which may probably be as indicated on Figs. 3–5.

The arrangement of the elements and the conductors is not illustrated, as it may be carried out in the usual way. On the inside the elements may be covered by a sheet of aluminium foil 3 and insulated against the inner part 4 of the rear wall by means of insulation material 5, for instance rock wool or glass wool.

The heater at each end is closed by means of a wall 6 and 7 secured to the front wall 2 by means of ears and bolts as seen on Fig. 2.

Further in the left hand end of the front wall there is cut out a rectangular part as indicated at 8 and the front wall along the inner edge of this part has a flange 9 carrying a dividing wall 10, whereby a compartment is formed behind the end wall 6 which may serve as a coupling box. For the introduction of electric lines the dividing wall 10 is provided with openings as indicated on Fig. 2, while the end wall 6 is provided with weakened parts 11 which may be broken away. The coupling compartment may be closed by means of a disk 16. The rear wall 4 and elements 1 terminate adjacent the dividing wall 10.

The heater is mounted on plane vertical strips 12, 12, which are adapted to be directly secured to the wall and are welded to flanges 13, 13 in the upper and lower part of the rearmost back wall 14. This wall 14 extends along the whole length of the heater and adjacent the coupling compartment is bent upon itself as indicated at 15 so as to form a strong base for the terminals. Further wall 14 is provided with suitable distribution with conical bosses 17 to which the front part 4 of the double back wall is welded. The heat conducting connection between members 4 and 14 will then only take place through these welding points. Further very small transmission of heat may take place by conduction of heat from front wall 2 to back wall 4. This is obtained by securing front wall 2 to the wall 4 by means of angular lugs 18, which are connected by screws with flanges 19 on member 4, the free ends of such lugs being bent backwards at a right angle, so that each lug 18 does only contact member 4 with two points. For this reason and owing to the insulation against the heating elements by means of aluminium foil 3 and the insulating material 5, the temperature of wall 4 will be considerably lower than the temperature of front wall 2 and the rearmost wall 14 is maintained at a still lower temperature owing to the air space and the badly heat conductive connection between parts 4 and 14. Further the front wall 2 does not extend right back to the wall on which the heater is fastened, so there is formed an air channel open at top and bottom between members 4 and 14, through which an air current passes upwards taking up heat from the back walls and distributing the same in the room. Further even the air space behind wall 14 has a certain insulating effect, the transmission of heat from member 14 to strips 12 being restricted to the points where said strips touch flanges 13.

The conduction of heat between the front and back wall may obviously be reduced in other ways than those illustrated, for instance it is possible to use between walls 4 and 14 bent over pointed lugs and screw connections instead of welded connections, or one might use insulating disks etc.

In the embodiment illustrated on Fig. 6 the air channel between the two sheets 4 and 14 of the double back wall is inclined in a forward direction at the top in order that the air current through that space shall be directed away from the wall, which might in some cases be blackened by dust or the like carried with the air current.

The back wall 14 in accordance with this embodiment is sharply bent over at the top and bottom, so as to form a continuation of the upper and lower edge of the front sheet 2. The same object, i. e. causing the air current to be deflected from the wall, may also be attained in the manner illustrated on Figure 11, by placing a deflecting member 36 on the wall a slight distance above the heater 2.

Figs. 7 and 8 illustrate the principal arrangement for securing the heater to the wall. At suitable interval along the upper and lower edge of the intermediate sheet, part of the material is cut out as indicated with the numeral 20 on Fig. 8 so as to form lugs 21, which pass through slots 22 in sheet 14 and are provided with bent-over portions 23, 24 for gripping sheet 14.

Front sheet 2 is provided along its edges with small brackets 25 with lugs or ears 26, 27 for gripping the edges of sheet 4, at the same time permitting a lengthwise movement of sheet 2 with relation to sheet 4.

In accordance with the embodiment illustrated on Figures 9 and 10 the resistance elements 28 instead of being located in channel irons as illustrated on Fig. 5 are placed in direct contact with the heat radiating sheet 2, and are maintained in their position by means of profile irons, such as 29, 30, which are welded to the inside of sheet 2 between the resistance elements.

Further, in this embodiment of the invention the connection between the front sheet 2 and intermediate sheet 4 as well as the connection between the latter and the back sheet 14 is so constructed that it permits a slight relative movement between the sheets so as to allow for heat expansion.

Front sheet 2 is provided at both edges with lugs 31, which pass through slots 32 in sheet 4, being provided with bent-over flaps 33 for locking purposes.

Sheet 4 is provided on its inside with similar lugs 34, which pass through slots 35 in sheet 14, said lug and slot connections 31, 32 and 34, 35 permitting a slight relative movement of the interconnected sheets, while at the same time providing a connection which is unable to conduct any appreciable amount of heat.

In accordance with the embodiment illustrated on Figures 12–15 there is provided means for interconnecting the three sheets of which the heater is composed in a manner by which the minimum amount of heat is transmitted to the wall. In accordance with this embodiment the front sheet, which is heated by means of heat resistance mounted on its inside (not shown) is provided on its inside with two longitudinally extending irons 37, which serve as a reinforcement of the front sheet as well as for engaging the intermediate sheet 4, which may preferably consist of brightly polished aluminium or similar material, which is able to reflect heat radiation. The rear sheet 14 is secured to the wall 38 in some suitable manner.

The connection between front sheet 2 and rear sheet 14 consists of metal strips 39, formed by punched out parts of channel irons 37, said strips being slotted at their inner ends so as to form two tongues 40, 41, which may be bent over on the back side of sheet 14 as illustrated on Figure 13.

The metal strips 39 are provided with holes 43, so as to have a part with a very much reduced cross section through which no appreciable amount of heat may be conducted from front sheet 2 to sheet 14.

Suitable distance pieces 44 of a U-shaped cross section are placed between sheets 4 and 14, metal strips 39 passing through slots in the U-shaped distance pieces.

Said distance pieces as will be seen on Fig. 13 have pointed ends, so that their area of contact with sheet 14 is as small as possible in order to avoid heat conduction.

The U-shaped distance pieces may be omitted in accordance with the embodiment illustrated on Figs. 14 and 15 by providing metal strips 39 with a punched out and bent-over flap 42 for engaging the front surface of sheet 14.

The form illustrated on Figs. 12 and 13 is however preferred, as the connecting strips 39 are less exposed to stresses and may therefore be given smaller dimensions.

When the intermediate sheet consists of aluminium, the heat expansion coefficient of which is very high, it is preferred to make this intermediate sheet in comparatively short lengths, which overlap at their ends, whereby the risk of distortion of the intermediate sheet owing to heat expansion is avoided.

Electric heaters of the kind specified above are generally produced in standard lengths, f. inst. a minimum length of 1 meter, and other lengths differing from each other, f. inst. by 25–40 centimeters. As these heaters are generally used as a substitute for bottom mouldings, it is desirable that the combined length of the heater sections should correspond exactly to the length of the different walls in the room. As this will obviously not be the case, there is provided in accordance with a further feature of the invention sheet metal profiles, which look exactly like the heaters and which may be cut up in any lengths desired to make up for those parts of the bottom moulding which cannot be formed by the ordinary sections of heater.

I claim:

In an electric heater of the type which is adapted to be secured to the wall of the room to be heated the combination comprising a heat radiating front sheet, heating elements secured to the inner surface of said front sheet, a back sheet adapted to be secured to the wall, connecting elements having a low capability of conducting heat connecting said back sheet to said front sheet, an intermediate sheet spaced from said back sheet so as to form an air channel open at the bottom and top between said intermediate and back sheets, said connecting elements of low heat conducting capability between said front and back sheets comprising narrow perforated metal strips secured to the inside of the front sheet and passing through slots in the intermediate and back sheet, U-shaped profile beams secured to the inner surface of the front sheet and serving as distance members between the front and intermediate sheets, said strips being punched out from the bottom part of said profile beams, U-shaped distance pieces with pointed ends placed between the intermediate and back sheets, said connecting strips passing through slots in said distance pieces.

GUSTAV ANDERSEN.

REFERENCES CITED

The following references are of record in the file of this patent:

UNITED STATES PATENTS

| Number | Name | Date |
|---|---|---|
| 1,617,916 | Kercher et al. | Feb. 15, 1927 |
| 1,664,171 | Hicks | Mar. 27, 1928 |
| 1,705,769 | Kercher et al. | Mar. 19, 1929 |
| 1,867,740 | Guy | July 19, 1932 |
| 1,913,002 | Russell et al. | June 6, 1933 |
| 2,269,578 | Buti | Jan. 13, 1942 |